3,816,607
METHOD FOR THE PREPARATION OF BERYLLIUM HYDRIDE FROM A DIALKYL BERYLLIUM SOLUTION

Frederick W. Frey, Jr., and Paul Kobetz, Baton Rouge, La., assignors to Ethyl Corporation, New York, N.Y.
No Drawing. Filed Oct. 2, 1964, Ser. No. 401,266
Int. Cl. C01b 6/00
U.S. Cl. 423—645               13 Claims

ABSTRACT OF THE DISCLOSURE

An improvement in the method of forming beryllium hydride from an ether solution of dialkyl beryllium which comprises adding a stoichiometric excess of an alkali metal hydride, then adding a beryllium halide to precipitate an alkali metal halide, and finally recovering beryllium hydride from the resulting solution by pyrolysis.

---

This invention relates to a novel and improved method for the preparation of beryllium hydride.

A wide variety of methods have been reported in the technical and patent literature for the preparation of beryllium hydride. One of the best methods developed to date involves the pyrolysis of di-tert-butyl beryllium in a high-boiling inert solvent. Beryllium hydride of 95 weight percent purity can be produced by this method. This method, however, is expensive because it requires the destruction of relatively costly butyl groups to generate a hydride moiety and there is no possibility of recovering the by-product olefin (isobutene). Also, the density of the product is lower than desired, primarily because of the turbulent conditions of agitation required to effect optimum results.

It has recently been reported by Bell and Coates (Proceedings of the Chemical Society, February 1964, page 59) that beryllium hydride can be prepared by pyrolysis of an ethereal solution of an alkyl beryllium hydride of the overall composition represented by the formula $R_4Be_3H_2$, prepared, in turn, by the reaction of an alkali metal dialkyl beryllium hydride with an ether solution of a beryllium halide.

However, in our attempt to produce beryllium hydride in accordance with this procedure, we have found that the product is of low purity and contains hydride and ethyl radicals in the approximate molar proportion of 2:1, which is evidence of the incomplete release of the ethyl groups.

We have found that if we conduct the pyrolysis in the presence of excess alkali metal hydride, complete or nearly complete release of the ethyl groups can be effected and a purer beryllium hydride product obtained, provided that the excess of alkali metal hydride is controlled within relatively narrow limits.

It is, therefore, an object of this invention to provide a method for the preparation of beryllium hydride of improved purity and density. Still another object of this invention is to provide a beryllium hydride product which is relatively free of alkali metal contamination. Other objects will appear hereinafter.

In accordance with the present invention, it has been found that when an excess of an alkali metal hydride is reacted with an ethereal solution of a dialkyl beryllium containing, in each alkyl group, from 1 to 10 carbon atoms, the resulting solution being treated with a beryllium halide to produce a soluble complex and an insoluble alkali metal halide, and the soluble complex being separated and pyrolyzed, an improved beryllium hydride product is obtained, and can be separated, provided that the excess of alkali metal hydride employed is not much above about 5 mole percent based on the dialkyl beryllium starting material. The use of a much larger excess of alkali metal hydride results in serious contamination of the product.

A preferred embodiment of the above process is the use, as reactants, of lithium hydride or sodium hydride and beryllium chloride. The last two reactants are probably the cheapest available raw materials for the preparation of beryllium hydride and can readily be obtained in high purity.

The use of excess alkali metal hydride is the most important parameter of the process. If no excess or a deficiency of alkali metal hydride is used, pyrolysis to remove the ethyl beryllium moiety is incomplete and the composition of the pyrolyzed product is such that the ratio of hydride radicals to ethyl groups is approximately 2. The release of ethyl groups can be effected by conducting the pyrolysis in the presence of excess sodium hydride. However, the concentration of excess sodium hydride must be controlled within relatively narrow limits if a product of reasonable purity is to be obtained. Thus, 1 mole percent excess sodium in the reaction produces a sodium concentration in the product of approximately 3 weight percent so that less than 3 mole percent excess sodium hydride must be used in the reaction if a beryllium hydride product of 90 weight percent purity or higher is desired.

Lithium hydride shows the same beneficial effect for release of the ethyl groups as does sodium hydride, but its lower molecular weight permits its use in larger excess with less deleterious effect upon product purity. Thus, a 10 mole percent excess of lithium hydride can be used to obtain a product of a purity of 90 or more weight percent.

Since lithium hydride is more expensive than sodium hydride, the most preferred embodiment of this invention involves reaction of stoichiometric amounts of sodium hydride, dialkyl beryllium and beryllium chloride to produce a complex alkyl beryllium hydride, followed by addition of lithium hydride equivalent to 5 to 10 mole percent of the sodium hydride employed. Pyrolysis of the resultant ethereal solution, after filtration to remove by-product alkali metal chloride and other unreacted solids, then produces beryllium hydride of a purity of 90 or more weight percent. Because the formation of beryllium hydride is effected by slow, controlled pyrolysis, the beryllium hydride product is appreciably denser than that obtained by solution pyrolysis of di-tert-butyl beryllium etherate and exhibits a density of 0.70 to 0.71 g./cc., making the product of this invention more suitable for use as a high-performance solid fuel.

The invention will be more fully understood by reference to the following illustrative examples in which all parts and percentages are by weight.

EXAMPLE I 4.81 parts of diethyl beryllium were dissolved in 155 parts of diethyl ether and the solution was reacted overnight at ambient temperature with 1.75 parts of sodium hydride. 8.15 parts of beryllium chloride dietherate were added, and the mixture was stirred for one hour and filtered. The filtrate was evaporated under vacuum at room temperature to remove the ether. The residue from the evaporation was heated under vacuum at 70 to 75° C. for 24 hours, then at 120 to 125° C. for 24 hours and finally at 180° C. for 8 hours. Analysis by acid hydrolysis indicated that the product contained about 18 percent by weight of beryllium hydride, together with about 46.5 percent of diethyl beryllium.

When the above example is repeated with the use of lithium diethyl beryllium hydride or sodium di-n-butyl beryllium hydride in place of the sodium diethyl beryllium hydride, similar results are obtained. Likewise the replacement of beryllium chloride with beryllium fluoride, beryllium bromide or beryllium iodide leads to similar results.

EXAMPLE II

Four parts of diethyl beryllium (60.0 millimoles) and 2.0 parts of 95% sodium hydride (79.2 millimoles, equivalent to about 32% excess) were added to 150 parts of ether and stirred for 60 hours at ambient temperature. Exactly 6.9 parts (30 millimoles) of $BeCl_2 \cdot 2Et_2O$ were added, and the slurry was stirred for two additional hours and filtered.

Thirty parts of the filtrate (approximate composition: $Et_4Be_3H_2 \cdot 0.32$ NaH) were heated under vacuum at 50° C., to remove ether. The viscous residue was pyrolyzed in accordance with the following schedule:

| Time in hours | Temperature, °C. | Pressure, mm. of Hg |
|---|---|---|
| 24 | 70 | 0.7 |
| 24 | 120 | 0.2 |
| 8 | 180 | 0.01 |

After the pyrolysis, a gray-white solid residue remained in the reactor. Complete analysis of the residue yielded the following results:

| | Found | Theory for $BeH_2$ |
|---|---|---|
| Millimoles of hydride hydrogen per gram | 65.5 | 181.2 |
| Millimoles of ethyl radical per gram | 1.45 | 0 |
| Percent beryllium | 28.10 | 81.88 |
| Percent sodium | 39.6 | 0 |

The above hydride content corresponds to a purity of 36 weight percent as beryllium hydride, with a hydride-to-ethyl ratio of 45.

EXAMPLE III

Sodium diethyl beryllium hydride (25.1 parts) is reacted with beryllium chloride bis-diethyl etherate (31.5 parts) in 100 parts of diethyl ether. The reaction mixture is filtered and the filtrate is treated with 0.11 part of lithium hydride. The ether solvent is then removed at room temperature under vacuum. The viscous residue is pyrolyzed by heating under vacuum as in Example II above. The pyrolysis residue contains 92 percent by weight of beryllium hydride.

When the above experiment is repeated omitting the lithium hydride addition, the pyrolysis residue contains 20 percent by weight of beryllium hydride and 70 percent by weight of diethyl beryllium.

A considerable variety of reactants can be employed in the process of the present invention. Thus the effective alkali metal hydrides include lithium hydride, sodium hydride, potassium hydride, rubidium hydride and cesium hydride. However, for reasons of economy, as indicated above, lithium hydride and sodium hydride are preferred. The beryllium halide reactant may contain any halogen having an atomic number from 9 to 53, inclusive, namely, fluorine, chlorine, bromine, or iodine. Examples of the dialkyl beryllium reactants include dimethyl beryllium, diethyl beryllium, di-n-propyl beryllium, diisobutyl beryllium, di-tert-butyl beryllium, di-n-hexyl beryllium, diisooctyl beryllium and di-n-decyl beryllium. Of these beryllium alkyl reactants, diethyl beryllium and di-tert-butyl beryllium are preferred because of their ready accessibility and because of their volatility and consequent ease of removal in the final stage of the preparation.

As indicated above, the first stage of the process of the invention is carried out in a solvent. Suitable solvents are aliphatic and cyclic ethers, for example, dimethyl ether, diethyl ether, diisopropyl ether, di-n-butyl ether, di-n-hexyl ether, di-n-octyl ether, di-n-decyl ether, tetrahydrofuran, dioxane, dioxolane, alkyl substitution products thereof and mixtures thereof. Diethyl ether is preferred because of its cheapness and ready availability and because of its high volatility which facilitates its removal from the reaction mixture.

As indicated above, the sodium or lithium hydride reactant is used in excess of the beryllium alkyl reactant but the amount of this excess may be varied over a moderate range. Thus, alkali metal hydride excesses varying from 0.1 mole percent to 30 mole percent may be used. However, excesses in the range of from about 1 to about 10 mole percent are preferred for lithium hydride and those in the range of from about 1.8 to about 2.8 mole percent for sodium hydride, because the use of these ranges results in increased purity of the beryllium hydride product.

The first or complex-formation stage of the process of the invention may be carried out at any temperature from about 0° C. to the boiling point of the solvent employed but ambient temperature is perfectly satisfactory and, because of the resulting ease of operation, is preferred. The temperatures in the second or pyrolysis stage are limited by the need to decompose the complex product of the first stage without causing significant decomposition of the beryllium hydride product of the second stage. Said complex product is therefore exposed to high temperatures for successive periods as follows: from about 70 to about 80° C. for 2 to 24 hours, then from about 110 to about 130° C. for 2 to 24 hours, and subsequently from about 170 to about 180° C. for 1 to 8 hours. Preferred pyrolysis periods are: 4 to 8 hours at from about 70 to about 80° C., 4 to 8 hours at from about 110 to about 130° C. and 2 to 4 hours at from about 170 to about 180° C. because these periods, at the indicated temperatures, are adequate to bring about a high degree of thermal decomposition of the complex to free beryllium hydride, and because the use of longer periods does not significantly increase the yield or purity of the beryllium hydride product.

The pressure employed in the complex formation stage is normally atmospheric but can range from 1 atmosphere or below to 5 atmospheres or above. The pressure in the pyrolysis stage can vary from about 0.001 to about 10.0 mm., the preferred range being from about 0.001 to about 0.5 mm. of mercury.

The beryllium hydride obtained by the process of this invention is, as indicated above, a valuable component of jet and rocket fuels. It is also useful as a source of storable hydrogen. It can be used for the metal plating of suitable substrates by thermal decomposition under suitable conditions in contact with said substrates and it is useful as a source (by thermal decomposition) of pure metallic beryllium for use in alloys and as a chemical raw material.

We claim:

1. In the process for the preparation of beryllium hydride which comprises reacting the hydride of an alkali metal having an atomic number from 3 to 55, inclusive, with a solution in an ether solvent of a dialkyl beryllium wherein each alkyl group contains from 1 to 10 carbon atoms, combining the resulting solution with a beryllium halide wherein each halogen atom has an atomic number from 9 to 53, inclusive, to produce a solution and an insoluble alkali metal halide, effecting a separation between said solution and said alkali metal halide, pyrolyzing said solution under suitable conditions of temperature and pressure to produce beryllium hydride and separating said beryllium hydride, the improvement which comprises employing said alkali metal hydride in stoichiometric excess with respect to said dialkyl beryllium, the amount of stoichiometric excess being in the range of from about 0.1 to about 30 mole percent based on said dialkyl beryllium.

2. The process of Claim 1 wherein the alkali metal hydride is sodium hydride.

3. The process of Claim 1 wherein the alkali metal hydride is lithium hydride.

4. The process of Claim 1 wherein the dialkyl beryllium is diethyl beryllium.

5. The process of Claim 1 wherein the ether solvent is diethyl ether.

6. The process of Claim 1 wherein the ether solvent is dimethyl ether.

7. The process of Claim 1 wherein the ether solvent is tetrahydrofuran.

8. The process of Claim 1 wherein the beryllium halide is beryllium chloride.

9. The process of Claim 1 wherein the alkali metal hydride is lithium hydride and the stoichiometric excess of lithium hydride is in the range of from about 1 to about 10 mole percent based on the dialkyl beryllium.

10. The process of Claim 1 wherein the alkali metal hydride is sodium hydride and the stoichiometric excess of sodium hydride is in the range of from about 1.8 to about 2.8 mole percent based on the dialkyl beryllium.

11. The process of Claim 1 wherein the alkali metal hydride is a mixture of sodium and lithium hydrides, the sodium hydride being present in approximately stoichiometric amount and the lithium hydride in the range of from about 1 to about 10 mole percent, both based on the dialkyl beryllium.

12. In the process for the preparation of beryllium hydride which comprises reacting an alkali metal hydride selected from the group consisting of lithium and sodium hydrides with a solution, in diethyl ether as solvent, of a dialkyl beryllium wherein each alkyl group contains from 1 to 10 carbon atoms, combining the resulting solution with a beryllium halide wherein each halogen atom has an atomic number from 9 to 53, inclusive, to produce a solution and an insoluble alkali metal halide, effecting a separation between said solution and said alkali metal halide, pyrolyzing said solution under suitable conditions of temperature and pressure to produce beryllium hydride and separating said beryllium hydride, the improvement which comprises employing said alkali metal hydride in stoichiometric excess with respect to said dialkyl beryllium, the amount of stoichiometric excess being in the range of from about 1 to about 10 mole percent when lithium hydride is the hydride employed and in the range of from about 1.8 to about 2.8 mole percent when sodium hydride is the hydride employed, both based on the dialkyl beryllium.

13. In the process for the preparation of beryllium hydride which comprises reacting an alkali metal hydride selected from the group consisting of lithium and sodium hydrides with a solution, in diethyl ether as a solvent, of a dialkyl beryllium selected from the group consisting of diethyl beryllium and di-tert-butyl beryllium, combining the resulting solution with beryllium chloride to produce a solution and an insoluble alkali metal chloride, effecting a separation between said solution and said alkali metal halide, pyrolyzing said solution under suitable conditions of temperature and pressure to produce beryllium hydride and separating said beryllium hydride, the improvement which comprises employing said alkali metal hydride in stoichiometric excess with respect to said dialkyl beryllium, the amount of stoichiometric excess being in the range of from about 1 to about 10 mole percent when lithium hydride is the hydride employed and in the range of from about 1.8 to about 2.8 mole percent when sodium hydride is the hydride employed, both based on the dialkyl beryllium.

References Cited

Bell et al., Proceedings of the Chemical Society, February 1964, p. 59.

CARL D. QUARFORTH, Primary Examiner

R. L. TATE, Assistant Examiner